United States Patent
Hummel et al.

(10) Patent No.: US 6,560,696 B1
(45) Date of Patent: May 6, 2003

(54) RETURN REGISTER STACK TARGET PREDICTOR

(75) Inventors: Vincent E. Hummel, Beaverton, OR (US); Harsh Sharangpani, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,180

(22) Filed: Dec. 29, 1999

(51) Int. Cl.[7] .................................................. G06F 9/38
(52) U.S. Cl. .................... 712/237; 711/109; 711/219; 712/219; 712/239
(58) Field of Search ................................. 712/239, 219, 712/237; 711/219, 109

(56) References Cited

U.S. PATENT DOCUMENTS 5,706,491 A * 1/1998 McMahan .................... 712/228
5,768,576 A * 6/1998 Hoyt et al. ..................... 712/23
5,964,868 A * 10/1999 Gochman et al. ............ 712/230
6,253,315 B1 * 6/2001 Yeh ............................. 712/238
6,314,514 B1 * 11/2001 McDonald ................... 711/132

* cited by examiner

Primary Examiner—Kenneth S. Kim
(74) Attorney, Agent, or Firm—Blakely, Sokoloff, Taylor & Zafman LLP

(57) ABSTRACT

A Next Return Target Address stack to maintain return addresses for call and return operations. The invention accommodates both definite return addresses and speculative return address in a single stack. Return addresses are written into the stack and read out of the stack at an entry/exit register interior to the stack. The stack has a lower portion below the entry/exit register for maintaining both actual and speculative return addresses, and an upper portion above the entry/exit register for maintaining return addresses that have been speculatively popped out. A branch history register keeps an ongoing record of the most recent calls and returns. In the event of a pipeline flush, such as would be caused by a branch mispredict, the contents of the branch history register are examined to determine how to adjust the contents of the stack. One or more depth counters keep track of which contents in the branch history register are to be examined.

20 Claims, 1 Drawing Sheet

RETURN REGISTER STACK TARGET PREDICTOR

BACKGROUND OF THE INVENTION

1. Field of the Invention

The invention pertains generally to a program return stack in a computer. In particular, it pertains to a stack for handling the target addresses of return instructions when some of the target addresses may be speculative.

2. Description of the Related Art

Computers predominately execute instructions in a linear fashion. But occasionally program execution must be temporarily diverted to a subroutine in another portion of memory to execute a particular function, only to return to the point of diversion when that function is complete. Such an operation is generically referred to as a call and return sequence. The call includes the process of branching away from the normal linear program execution, and the return includes the process of returning to the point from which execution was diverted, to resume execution from that point.

Call and return sequences can be nested, so that a second call can be triggered before the first return has completed, and a third call can be triggered before the second return has completed. The third return is then completed before the second return, and the second return is completed before the first return. Multiple levels of nesting are thus permitted, with each level returning to it's associated point of diverted execution.

Push-and-pop stacks, also referred to as last-in-first-out (LIFO) buffers, are used to organize the nesting of call and return operations. In such a stack, each time a call is initiated, the address of the point of diversion is placed on top of the stack and all previously entered return addresses are "pushed down". When the return is performed, using the address at the top of the stack as a return address, that address is removed from the top of the stack and discarded, while the most recent address to be pushed down is "popped up" to the top of the stack. By using this push and pop operation for return addresses, the returns are executed in reverse order of the calls.

This relatively simple operation becomes more complicated when instruction pipelines and predictive branching are used to increase overall processing speed. Both techniques are commonplace in computer architecture. Instruction pipelines take advantage of the fact that the execution of each instruction is a series of predefined sequential operations. The pipeline contains several successive stages, with each stage performing one of those operations. Each instruction is fed into the pipeline, and passed from stage to stage for each successive operation. In this way, multiple instructions can be in the pipeline at the same time, with each in a different stage at any given time.

Predictive branching is required when conditional branch instructions go through the instruction pipeline. A conditional branch instruction will branch to one set of instructions if a condition is met, but will go to a different set of instructions if the condition is not met. Frequently the condition is not determined, and the correct set of subsequent instructions is therefore not known, until immediately before the conditional branch instruction is to be executed. This creates a dilemma, since the instructions following the conditional branch instruction are already in the pipeline before it is known if those following instruction are the correct ones. Simply refusing to feed instructions into the pipeline until they are firmly identified creates intolerable delays in processing. To avoid this, various methods have been developed to predict which set of instructions is likely to be the correct one, and then feed that set into the pipeline. If the prediction is incorrect, at least a portion of the pipeline will be flushed and refilled with the correct instructions, resulting in a delay. But if the predictive method is sufficiently accurate, the occurrence of pipeline flushing will be low, resulting in minimal slowdowns in processing.

Since a call operation can be in one of the two possible branch paths, placement of the associated return address on the stack is speculative, and that return address is removed or invalidated if the predicted path proves to be incorrect.

Although conventional terminology conceptually refers to the "top" of a stack, this is merely the defined entry/exit point for the return address data. FIG. 1 shows a conventional stack 1, which places return data into sequential locations N through N+n of an addressable storage space 5, and uses a pointer in a separate register 3 to point to the address containing the top of the stack. The pointer is then incremented or decremented to shift the top of the stack as the push and pop operations are performed, while the data itself is not shifted. To handle branch predictions, two versions of the stack are maintained. A predictive version includes return addresses for predicted branch paths, and this version feeds an early stage of the instruction pipeline. An architectural version includes return addresses that have been verified as correct, and this version feeds into a later stage of the instruction pipeline.

The use of a pointer introduces an extra step, and an associated delay, into the process of identifying the entry/exit point of the stack. Maintaining two copies of the stack requires additional logic, occupying more space on the integrated circuit die. Both of these results are detrimental to the overall cost and efficiency of the computer.

SUMMARY OF THE INVENTION

An embodiment of the invention includes an apparatus with a bidirectional register stack having multiple registers coupled together. The registers include an entry/exit register positioned in the interior of the register stack. The embodiment also includes a history register, a history depth counter circuit, and a control circuit coupled to the register stack, the history register, and the history depth counter circuit.

DETAILED DESCRIPTION OF THE INVENTION

An embodiment of the invention includes a group of registers connected in parallel as a bi-directional register stack so that the contents of each register can be shifted up or down into or out of an adjacent register. These registers can contain the return addresses of previously encountered call/return sequences or subroutines. New return addresses are written into the stack at the entry/exit register and old return addresses are read out of the stack at the entry/exit register. Unlike conventional stacks in which the entry/exit register is at the end of the stack, the entry/exit register of the invention is at an interior location of the stack. This permits data to be shifted between the entry/exit register and adjacent registers in either direction. The entry/exit register is the register that holds the current return value. The registers below the entry/exit register can contain previous return addresses that have been pushed down on the stack. The registers above the entry/exit register can contain return addresses that have been speculatively popped up from the stack. There is also a separate branch history memory device to record the order in which calls and returns are encountered, and one or more counters to determine which of the contents of the branch history memory device to use when a branch mispredict is encountered. A branch mispredict occurs when the computer system determines that the previously predicted result of a conditional branch instruction is incorrect, and some of the instructions that follow the conditional branch instruction in the instruction pipeline must be replaced with the correct instructions. Methods for detecting a branch mispredict and replacing instructions in the instruction pipeline are known in the art.

Figure 2:
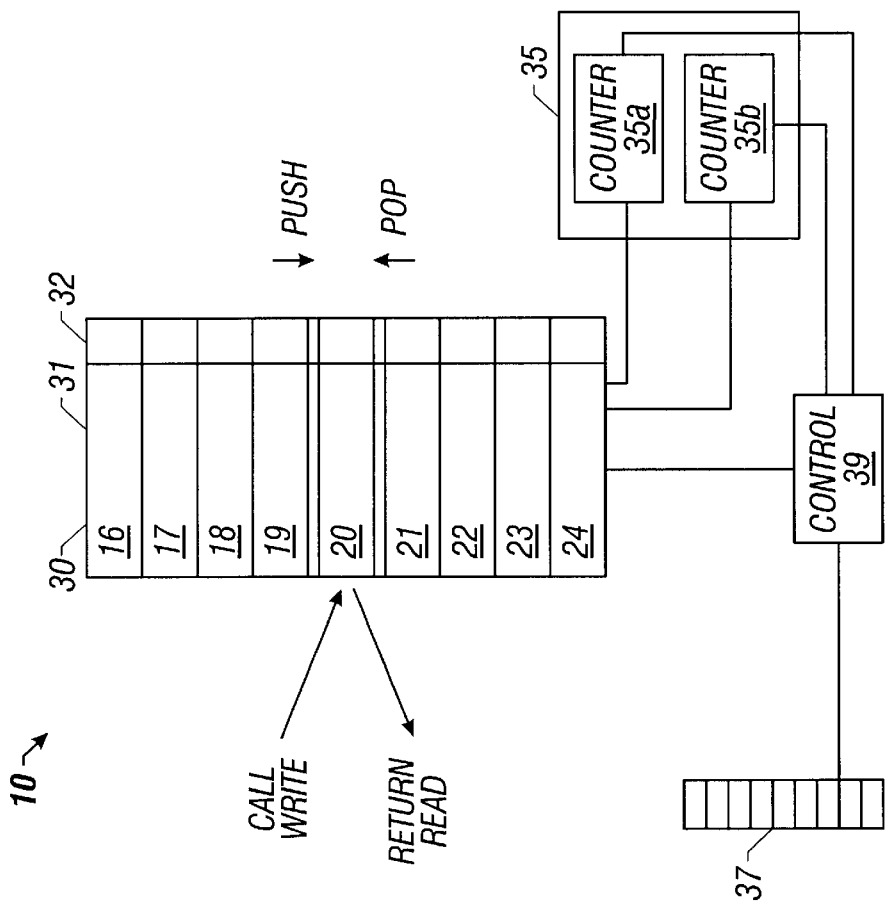
FIG. 2 shows an embodiment of a stack of the invention.
Figure 1:
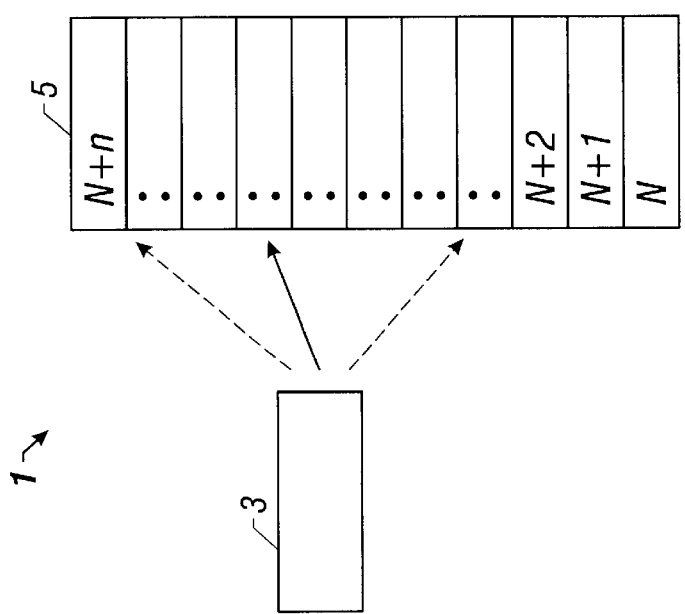
FIG. 1 shows a conventional stack.

FIG. 2 shows a stack 10 of the invention, which includes register stack 30, containing a stack of registers 16 through 24 connected so that the contents of each register can be shifted up into the register above it, or down into the register below it. (Note: the terms "up" and "down", as used herein, refer to the orientation of the symbology of FIG. 2, and not to the physical orientation of a physical stack.) Any data shifted up out of register 16 or down out of register 24 will be lost, since there is no register positioned to receive that data. Conversely, any data shifted down into register 16 or up into register 24 will be indeterminate, since there is no register positioned to provide that data. Register 20 is the entry/exit point for the stack, the location at which return addresses are written when a call operation is detected, and read when a return operation is detected.

A call operation pushes the contents of all registers down by one position, and writes the associated return address into register 20. This overwrites the contents that were shifted into register 20 from register 19. A return operation reads the associated return address out of register 20 and pops the contents of all registers up by one location.

The entire stack is pushed down for a call operation, or popped up for a return operation. Thus for a push, the contents of register 23 are shifted into register 24, the contents of register 22 are shifted into 23, 21 into 22, 20 into 21, 19 into 20, 18 into 19, and so forth throughout the stack. The contents of register 24 will be lost, while register 16 will receive an indeterminate value. For a pop the directions are reversed, with the contents of 19 being shifted into 18, 20 into 19, 21 into 20, etc. for the rest of the stack. The contents of register 16 will be lost, while register 24 will receive an indeterminate value.

Loss of useful data can be prevented by sizing the depth of stack 10 to optimize the number of addresses stored, given the area on the semiconductor die that each register requires. The size below the entry point is determined by the nature of the calls and returns in the program. The size above the entry point is determined by the length of the pipeline and by the nature of the calls and returns in the program. In one embodiment, the stack has twice as many registers below the entry/exit register as above it.

Each register 16–24 in register stack 30 includes two portions. Column 31 represents the portion of all the registers in which the return addresses are contained, and it has the proper width to accommodate these addresses. One embodiment uses 64 bits in each register to accommodate 64-bit addresses. Each return address is written into the stack at register 20, and shifted up or down until those contents are either overwritten at register 20 or shifted out one of the ends of the stack.

Column 32 represents the portion of all the registers that indicates the validity of the data in the address portion. In one embodiment, column 32 is one bit wide and that portion of each register is termed the valid bit. A valid bit in column 32 shifts up or down with the associated return address in column 31. In one embodiment, a valid bit contains a logic '1' to indicate the contents at that location represent an actual or potential return address and are therefore valid, while a logic '0' indicates the contents of that location do not represent an actual or potential return address and are therefore invalid. An indication of validity does not mean that the associated contents of the return address portion are non-speculative. Rather, an indication of invalidity means that the associated contents of the return address portion are meaningless and will definitely not be used as a return address. An invalid condition can be acquired by initializing the contents at startup, by shifting in an indeterminate value from either end of the stack, or by purposefully invalidating the contents by writing a logic '0' into the valid bit. A valid condition can be acquired by writing a logic '1' into the valid bit at the time a return address is written into register 20.

Branch history register (BHR) 37 is a memory circuit that maintains a serial record of the number of calls and returns that have been made. In one embodiment, BHR 37 is a one-bit-wide shift register, although other types of data memory devices may also be used. A logic '1' is shifted into the input end of the shift register when a call is made, while a logic '0' is shifted into the same end of the shift register when a return is made. The most recent entries in BHR 37 represent a serial record of the most recent calls and returns. In another embodiment, BHR 37 is a bit-addressable register, and a logic '1' for a call or a logic '0' for a return can be written into any selected bit position. BHR 37 has the same number of bits as the stack contains locations. One embodiment has 16 stack locations, 16 bits in BHR 37, and 4 bits in history depth counter circuit 35.

History depth counter circuit 35 is used to indicate the depth of the contents of BHR 37, i.e., how many potentially useful return addresses are contained in consecutive locations of the stack, including those addresses that are located both above and below entry/exit register 20.

Control 39 contains the logic to couple together stack 30, BHR 37 and counter circuit 35, and to control these elements in the manner described herein.

In operation, when a call is encountered in the front end of the instruction pipeline, the entire contents of stack 30 are pushed down by one position, the return address for the call is written into entry/exit register 20, history depth counter 35 is adjusted in a manner described below, and a '1' is shifted into BHR 37. When a return is encountered, the value in entry/exit register 20 is read out and used as the return address, history depth counter 35 is adjusted, and a '0' is shifted into BHR 37.

Whenever the instruction pipeline is flushed, such as when a branch mispredict is detected, the stack must be modified to account for the removal of the mispredicted instructions. The contents of the stack are therefore adjusted to remove the mispredicted return addresses from consideration. History depth counter 35 is used to determine how many of the BHR 37 locations to examine. Within that examined portion, the difference between the number of recorded calls and the number of recorded returns is determined. The stack is then pushed or popped a number of times equal to this difference. If the number of calls exceeds the number of returns, the stack is popped the indicated number of times. If the number of returns exceeds the number of calls, the stack is pushed the indicated number of times. For example, if the examined portion of the history register contains three logic 1's (for 3 calls) and one logic 0 (for one return), the stack is popped (3–1) times, or twice. As always, any data shifted in from the ends of the stack during this process is flagged as invalid, and any data shifted out of the ends of the stack is lost.

Various embodiments of history depth counter 35 can be used. One embodiment uses a single counter 35a. When a call or return is predicted, history depth counter 35a is incremented, and the appropriate bit (1 for a call and 0 for a return) is shifted into BHR 37. When a call or return is retired, counter 35a is decremented and the contents of BHR 37 are shifted one bit, losing the least recent bit by shifting it out the end of BHR 37. A call or return is defined as retired when the instruction processing circuitry of the computer determines that a call/return sequence is the correct one and is no longer speculative. When a branch misprediction is detected, the contents of depth counter 35a indicate the branch history depth, and this number is used to determine how many bits of BHR 37 to examine. After determining this, history depth counter 35a is reset to zero.

In another embodiment two counters 35a and 35b are used, and BHR 37 does not shift. Speculative counter 35a points to the BHR entry corresponding to the last predicted call or return, while retired counter 35b points to the BHR entry corresponding to the last retired call or return. History depth is the difference between the contents of these two counters, and the value of that difference determines the number of bits in BHR 37 to examine. When a call or return is predicted, speculative counter 35a is incremented, and the appropriate bit (1 for a call, 0 for a return) is written into the location of BHR 37 that is pointed to by speculative counter 35a. When a call or return is retired, retired counter 37b is incremented. When a branch misprediction is detected, history depth is calculated as the difference between the contents of the two counters 35a and 35b, and this number determines how many bits in BHR 37 to examine. After determining this, speculative counter 35a is set to the same value as retired counter 35b.

The aforementioned stack design allows a single stack to contain return addresses that have been determined and also contain those that are still speculative. The design is well suited to a very fast, efficient hardware implementation, but software implementations are also included in the invention.

The foregoing description is intended to be illustrative and not limiting. Variations will occur to those of skill in the art. Those variations are intended to be included in the invention, which is limited only by the spirit and scope of the appended claims.

We claim:

1. An apparatus, comprising:
   a bi-directional register stack having a plurality of registers coupled together, including an entry/exit register positioned in an interior of the register stack;
   a memory circuit to maintain a branch history of calls and returns to the bi-directional register stack;
   a history depth counter circuit to indicate how many potentially useful return addresses are contained in the bi-directional register stack; and
   a control coupled to the register stack, the memory circuit, and the history depth counter circuit.

2. The apparatus of claim 1, wherein each of the plurality of registers includes an address portion and a validity portion to indicate validity of the address portion.

3. The apparatus of claim 1, wherein the memory circuit includes a shift register having a plurality of locations to indicate previous calls and returns.

4. The apparatus of claim 3, wherein the history depth counter circuit includes a counter output to indicate how many of the plurality of locations to examine upon a pipeline flush.

5. The apparatus of claim 3, wherein the history depth counter circuit includes a first counter to point to a last predicted entry in the memory circuit and a second counter to point to a last retired entry in the memory circuit.

6. The apparatus of claim 1, further comprising a control circuit to control the register stack, the memory circuit, and the history depth counter circuit.

7. A computer system comprising:
   an instruction pipeline;
   a branch mispredict detector; and
   a return address stack coupled to the instruction pipeline and to the branch mispredict detector to maintain return addresses for call and return operations, the return address stack including:
      a bi-directional register stack having a plurality of registers coupled together, including an entry/exit register positioned in an interior of the register stack;
      a memory circuit to maintain a branch history of calls and returns to the bidirectional register stack;
      a history depth counter circuit to indicate how many potentially useful return addresses are contained in the bi-directional register stack; and
      a control coupled to the register stack, the memory circuit, and the history depth counter circuit.

8. The computer system of claim 7, wherein each of the plurality of registers includes an address portion and a validity portion to indicate validity of the address portion.

9. The computer system of claim 7, wherein the memory circuit includes a shift register having a plurality of locations to indicate previous calls and returns.

10. The computer system of claim 9, wherein the history depth counter circuit includes a counter output to indicate how many of the plurality of locations to examine upon a pipeline flush.

11. The computer system of claim 9, wherein the history depth counter circuit includes a first counter to point to a last predicted entry in the memory circuit and a second counter to point to a last retired entry in the memory circuit.

12. The computer system of claim 7, further comprising a control circuit to control the register stack, the memory circuit, and the history depth counter circuit.

13. A method of handling return addresses in a computer system, comprising:
   responding to detection of a call operation by:
      shifting contents of a bidirectional register stack in a first direction;
      writing a return address associated with the call operation into an interior register of the register stack;
      recording a first status indicator in a memory circuit;
   responding to detection of a return operation by:
      reading the return address from the interior register;
      shifting the contents of the register stack in a second direction opposite the first direction;
      recording a second status indicator in the memory circuit;
   responding to detection of a branch mispredict by:
      determining a difference in a quantity of first status indicators and a quantity of second status indicators recorded in the memory circuit; and
      shifting the contents of the register stack in a manner indicated by a result of said determining.

14. The method of claim 13, wherein shifting the contents of the register stack in a manner indicated by a result of said determining includes:
- shifting the contents by an amount equal to said difference;
- shifting the contents in the first direction if the quantity of second status indicators is larger than the quantity of first status indicators; and
- shifting the contents in the second direction if the quantity of first status indicators is larger than the quantity of second status indicators.

15. The method of claim 13, wherein:
- responding to detection of a call operation is repeated a first plurality of times for detection of a first plurality of detected call operations;
- responding to detection of a return operation is repeated a second plurality of times for detection of a second plurality of detected return operations; and
- responding to detection of a branch mispredict is repeated a third plurality of times for detection of a third plurality of detected pipeline flushes.

16. The method of claim 13, wherein recording first and second status indicators includes recording said first and second status indicators in a serial shift register.

17. The method of claim 13, wherein writing a return address includes writing a validity indicator to validate the return address.

18. The method of claim 13, wherein:
- responding to detection of a call operation further includes incrementing a counter;
- responding to detection of a return operation further includes incrementing the counter; and
- responding to detection of a pipeline flush further includes:
  - using a quantity in the counter in said determining; and
  - resetting the counter after said determining.

19. The method of claim 13, wherein:
- responding to detection of a call operation further includes incrementing a first counter;
- responding to detection of a return operation further includes incrementing a second counter; and
- responding to detection of a pipeline flush further includes:
  - using a difference in a quantity in the first counter and a quantity in the second counter in said determining; and
  - resetting the quantity in the second counter to equal the quantity in the first counter after said determining.

20. A machine-readable medium having stored thereon instructions, which when executed by at least one processor cause said at least one processor to perform:
- responding to detection of a call operation by:
  - shifting contents of a bi-directional register stack in a first direction;
  - writing a return address associated with the call operation into an interior register of the register stack;
  - recording a first status indicator in a memory circuit;
- responding to detection of a return operation by:
  - reading the return address from the interior register,
  - shifting the contents of the register stack in a second direction opposite the first direction;
  - recording a second status indicator in the memory circuit;
- responding to detection of a branch mispredict by:
  - determining a difference in a quantity of first status indicators and a quantity of second status indicators recorded in the memory circuit; and
  - shifting the contents of the register stack in a manner indicated by a result of said determining.

* * * * *